US008644980B2

(12) United States Patent
Gao et al.

(10) Patent No.: US 8,644,980 B2

(45) Date of Patent: Feb. 4, 2014

(54) SENSOR FOR HANDLING SYSTEM

(75) Inventors: Dalong Gao, Troy, MI (US); Diana Marie Wegner, Bloomfield Hills, MI (US); Roland J. Menassa, Macomb, MI (US); Alexandre Lecours, Quebec (CA); Clement Gosselin, Quebec (CA); Thierry Laliberte, Quebec (CA); Simon Foucault, Quebec (CA); Vincent Duchaine, Quebec (CA)

(73) Assignees: GM Global Technology Operations LLC, Detroit, MI (US); Universite Laval, Quebec (CA)

( * ) Notice: Subject to any disclaimer, the term of this patent is extended or adjusted under 35 U.S.C. 154(b) by 1101 days.

(21) Appl. No.: 12/626,981

(22) Filed: Nov. 30, 2009

(65) Prior Publication Data

US 2011/0130862 A1 Jun. 2, 2011

(51) Int. Cl.
*G06F 7/00* (2006.01)

(52) U.S. Cl.
USPC .......... 700/213

(58) Field of Classification Search
USPC .......... 700/213
See application file for complete search history.

(56) References Cited

U.S. PATENT DOCUMENTS

| | | | | |
|---|---|---|---|---|
| 8,010,219 | B2 * | 8/2011 | Martinez et al. | 700/112 |
| 8,346,388 | B1 * | 1/2013 | Tritz | 700/230 |
| 2008/0000074 | A1 * | 1/2008 | Martinez et al. | 29/593 |
| 2011/0130862 | A1 * | 6/2011 | Gao et al. | 700/213 |

* cited by examiner

*Primary Examiner* — Ramya Burgess

(74) *Attorney, Agent, or Firm* — Quinn Law Group, PLLC

(57) ABSTRACT

The cable lift system provides assistance to movement of a flexibly suspended payload actuated by operator input into one or more sensing devices attached to the payload. The sensing device is configured to collect information about the typical push-pull and lift-lower motions of an operator moving the payload horizontally and/or vertically, such that the operator's input to the sensor is intuitive and is provided in a manner which is substantially transparent to the operator. The assist mechanisms included in the system are actuated by a controller processing signals received from the one or more sensing devices on the payload. Movement assistance is provided such that the manual effort required by the operator to overcome the inertia of the payload in a starting or stopping event is substantially relieved, thus minimizing the ergonomic impact of the starting and stopping events on the operator.

12 Claims, 3 Drawing Sheets

SENSOR FOR HANDLING SYSTEM

TECHNICAL FIELD

The present invention relates to a method and apparatus for lifting a payload using a flexible suspension system, and in particular to providing assistance in the movement of a payload suspended from a flexible suspension system which is a cable lift system.

BACKGROUND OF THE INVENTION

Cable based lift systems are used in conjunction with track rail or bridge and trolley systems, to move cable suspended payloads. Movement along two horizontal axes can be obtained by moving a bridge on fixed rails along a first axis, then moving a trolley along the bridge along a second horizontal axis, in a direction perpendicular to the direction of the fixed rails. The cable system provides vertical lift assistance, typically through a hoist which may be motorized. The operator physically pushes and pulls the cable suspended payload to start, continue, slow or stop the horizontal movement of the payload. The starting-and-stopping strain on the operator, when the operator must overcome maximum inertia of the payload, is a known ergonomic problem with these types of systems.

A cable lift system with horizontal movement assistance exists which is actuated by an angular deviation of the payload suspending cable from a vertical position. However, horizontal assistance is only actuated after the angle of the cable is deviated from a vertical position, e.g., after the operator has become strained by inputting a manual starting or stopping force against the payload. Because horizontal assistance is not actuated until after the operator has exerted force against the payload to cause the cable to deviate from vertical, this type of device does not address the known ergonomic problem. Another device to provide horizontal assistance includes a vertical column and handle bar arrangement which is disadvantaged by high cost, limited flexibility, increased weight and non-intuitive operator controls.

SUMMARY OF THE INVENTION

The flexible suspension system provided herein provides assistance to horizontal and vertical movement of a flexibly suspended payload actuated by operator input into one or more sensing devices attached to the payload. The flexible suspension system may be, for example, a cable lift system, where the payload is suspended by a flexible suspension device which may be a cable or chain configured with a hoist or similar means to lift and lower the payload in a vertical direction. The sensing device is configured to collect information about the typical push-pull motions of an operator moving the payload in a horizontal plane, such that the operator's input to the sensor is intuitive and is provided through controls which are relatively transparent to the operator. The sensing device may also be configured to collect information about the lift and lower motions of an operator moving the payload in a vertical plane.

The horizontal and vertical assist mechanisms included in the system are actuated by a controller processing signals received from the one or more sensing devices on the payload. Horizontal movement assistance is provided such that the manual effort required by the operator to overcome the inertia of the payload in a starting or stopping event is substantially relieved, thus minimizing the ergonomic impact of the starting and stopping events on the operator. Vertical movement assistance is provided such that the manual effort required by the operator to adjust the load vertically is substantially relieved, minimizing the ergonomic impact of these motions on the operator.

A method for use and a handling system configured to provide horizontal and/or vertical assistance to an operator moving a payload suspended from a cable is provided herein. The assisted flexible suspension system, which includes the category of flexible suspension systems referred to as cable lift systems, includes a cable, which may be of any type of cable, such as a steel cable or a chain, configured to attach to a trolley at a first end and a payload at the second end, where the trolley includes assist mechanisms adapted to assist movement of the payload in a horizontal plane and assist mechanisms adapted to the hoist and/or trolley to assist movement of the payload in a vertical plane. The assist mechanisms may include one or more brakes and/or one or more motors. As would be understood by one skilled in the art, other assist mechanisms, including pulley systems and counterbalances, could be used within the scope of the claimed invention.

A sensing device is provided herein which is adapted to be operatively attached to the payload and is configured to sense the input force and direction of manual movement of the payload and to transmit a signal including force and direction information to a controller. Manual movement, as used herein, includes at least one of starting, accelerating, continuing, rotating, slowing and stopping movement of the payload in a horizontal plane, and/or at least one of lifting, lowering, tilting and angling the payload in a vertical plane.

A controller is provided and configured to receive and process signals from one or more sensing devices attached to the payload. The controller provides input to the trolley assist mechanisms, to assist movement of the payload in response to signals from one or more sensing devices, where the signals correspond to manual input from an operator moving the payload. The controller may also provide input to the trolley to move the trolley to a predetermined location, for example, a payload loading station. The controller may be further configured to receive and process signals from multiple sensing devices simultaneously receiving force and direction input from multiple operators handling a single payload, where one of the operators and the related sensing devices are designated as a lead operator. In this instance, the controller is configured to identify the signals inputted by the lead operator and to use an algorithm to process the incoming signals from the multiple operators, giving priority to the lead signals and excluding or reconciling conflicting signals from non-lead sensing devices. The sensing devices may be configured, in this instance, to be assigned as a lead device, and further to transfer or reassign lead device role to another sensing device through the controller.

The controller may be configured to receive and transmit wireless signals. The sensing devices may be configured to transmit wireless signals. The sensing device provided herein is adapted to be operatively attached to the payload and may be configured to be detached from the payload after movement of the payload by the handling system is completed and reattached to another payload, so as to be reusable. In another embodiment, the sensing device is configured to remain attached to the payload permanently or semi-permanently, so as to be disposable after movement of the payload by the handling system is completed.

The sensing device may be configured as a handle, with sensors that are positioned on the handle such that when an operator grasps the handle in a typical manner, the sensors can detect and collect force, torque and directional information without further input from the operator. The collection of force, torque and directional information may therefore be configured to be substantially transparent with respect to the operator, therefore allowing the operator to guide the payload using the handle in an intuitive manner and without requiring the operator to actively request assistance from the trolley. In another embodiment, the sensing device may be configured as a sensor pad comprised of pressure sensitive conductive materials such as force sensitive resistor tape.

The assistance flexible suspension system, also referred to as a cable lift system, provided herein provides the advantage of a flexible system of sensing devices which can be used with multiple types and configurations of payloads, in a wired or wireless configuration, while substantially eliminating the ergonomic strain associated with the manual pushing, pulling, rotating, lifting and/or lowering of cable suspended loads. The assist mechanisms are provided with minimal additional weight to the cable lift system, with low cost and significant flexibility. The sensing devices provide an intuitive interface to the operator, with the capability to collect force and direction information using controls which may be configured to be substantially transparent to the operator, thus making the system easy to use with minimal training.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
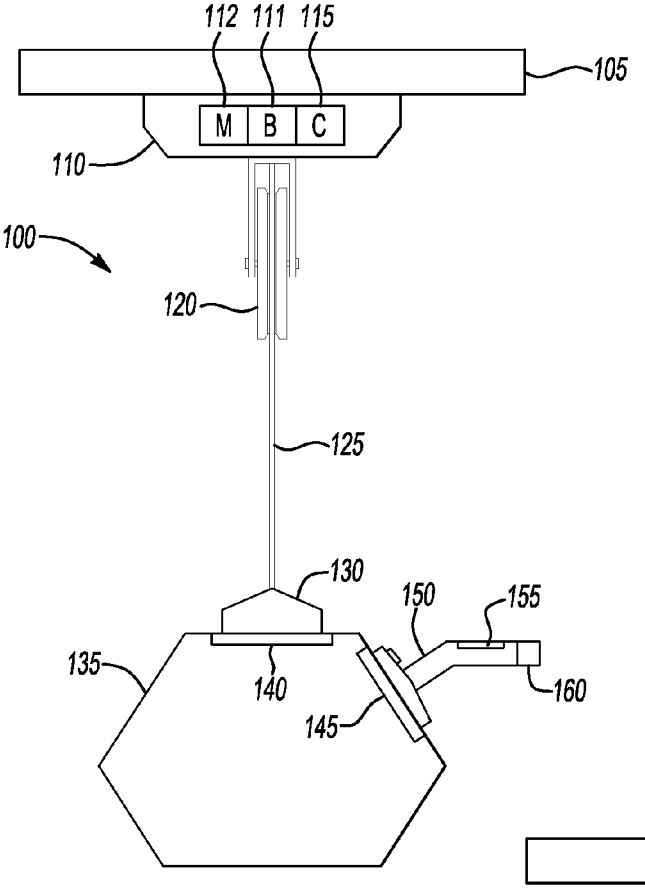
FIG. 1 is a schematic plan view of an assisted cable lift system with a detachable wireless sensing device configured as a handle.

Referring to the drawings, wherein like reference numbers refer to like components, FIG. 1 presents a schematic plan view of an assisted flexible suspension system, in particular a cable lift system with detachable wireless sensing devices. In a preferred embodiment, generally indicated at 100 is an assisted cable lift system including a trolley 110 moving on a bridge and rail system 105. Horizontal movement of trolley 110 as shown is assisted by one or more assist mechanisms, which may include one or more motors 112 and one or more brakes 111, which receive input from a controller 115 in response to input from a sensing device 155 attached to payload 135. As would be understood by those skilled in the art, horizontal movement of the trolley may be assisted by other means, such as pulleys, cables, servo-actuators and the like, in response to inputs from a controller 115. The trolley 110 incorporates a cable 125 and hoist mechanism 120. The hoist mechanism 120 may be a motorized hoist, for example, and is used to lift and lower payload 135 suspended from the cable 125 in a generally vertical direction.

Cable 125 includes a payload attachment 130, which may be of any type suitable for attaching to payload 135 which is being moved. For example, payload attachment 130 may be a hook, and cable attachment feature 140 may be an eye bolt fixedly attached to payload 135, which may be, for example, and automotive engine or transmission assembly. Alternatively, the cable attachment feature 140 may be an element of payload 135 without being a separate feature, for example, a rib in a section of aircraft fuselage which may be directly attached to by a hook. Payload attachment 130 may be a clamping mechanism, which may be used, for example, to clamp directly onto a feature of payload 135 provided for that purpose such as a rib or fin, or directly onto the payload 135 itself, for example, where payload 135 is a slab of granite or precast concrete.

Payload 135 may further include a sensor attachment feature 145 for attachment of a sensing device or sensor 155 responsive to operator movement. As shown in FIG. 1, sensing device 155 may be incorporated into or configured as a handle 150, which may be attachable to payload 135 by any means known to those skilled in the art. For example, handle 150 may be attached with one or more bolts to payload 135, wherein the sensor attachment feature 145 may be a pattern of one or more threaded holes to receive the bolts. Alternatively, the handle may be configured to be inserted into an existing hole or orifice in the payload using a threaded, tapered or expanding plug, or may be configured to attach to a protruding feature of the payload using a collet, clamp or similar feature, where the attaching feature may be configured for quick attachment and/or quick release. Sensor attachment feature 145 may be a section of payload 135 which is of appropriate configuration or profile such that it provides an attachment surface without additional preparation. For example, payload 135 may be of a magnetic material and handle 150 may be configured to include one or more magnetic elements which can be actuated as a quick attach/quick release feature to operatively attach directly to payload 135. As another example, payload 135 may be a construction material, such as glass sheet or granite slab and handle 150 may include one or more suction cups to operatively attach directly to payload 135.

As shown in FIG. 1, handle 150 is a standalone unit which may be attached to payload 135 during the process of attaching payload 135 to cable system 100, or may be attached to the payload 135 at any time earlier and transported with the payload prior to attaching payload 135 to cable system 100. For example, handle 150 may be attached by an engine supplier before the engine is provided to a vehicle assembly plant where the engine may be moved by a cable lift system using the assistance system of the claimed invention in the vehicle assembly plant during assembly into a vehicle. Handle 150 may then be detached from payload 135 after its movement is completed, and reused on another payload. For example, after assembly of the engine in the vehicle, handle 150 may be detached and returned to the engine supplier to be attached on another engine.

Figure 2:
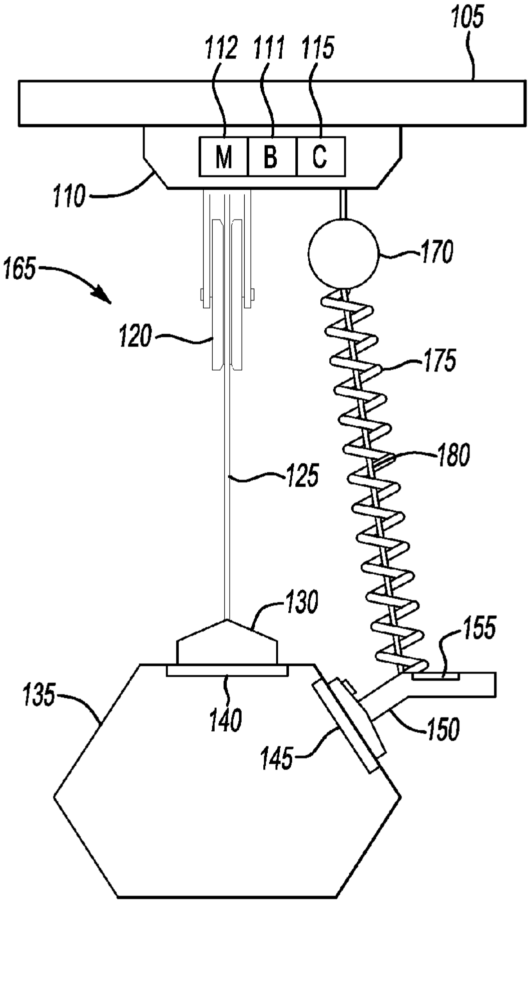
FIG. 2 is a schematic plan view of an assisted cable lift system with a detachable wired sensing device configured as a handle.

Shown in FIG. 2 is an alternate arrangement of an assisted cable lift system generally indicated at 165, wherein sensing device or sensor 155 is attached to trolley 110 by a tool holder 170. Tool holder 170 is shown in FIG. 2 as a retractable tool holder including a retractable cable 175, although other commonly known means of overhead tool attachment may be used. In this arrangement, handle or handles 150 are attached and detached from payload 135 as part of the process of connecting and disconnecting payload 135 from cable lift system 165.

Referring again to FIG. 1, sensing device 155 is shown incorporated into or configured as a handle 150 including one or more sensors 155. Handle 150 is used by an operator to manually direct or guide movement of payload 135 as payload 135 is moved horizontally and/or vertically in response to operator movement while suspended vertically by cable 125 from trolley 110. As the operator exerts a force on handle 150 and sensors 155 to move payload 135, sensors 155 collect force, torque and directional information regarding the intended movement of payload 135 by the operator. One or more sensors 155 may include a generic six degrees of freedom (6 DOF) system used to collect force and torque information. Alternatively, one or more sensors 155 may be a combination of customized sensors to provide a different combination of force sensing capabilities. The sensors 155 may include a gyro sensor, compass or other means to sense the intended direction of movement based on manual input from an operator. Sensors 155 are positioned on handle 150 such that when an operator grasps handle 150 in a typical manner, sensors 155 can detect and collect force, torque and directional information without further input from the operator. The collection of force, torque and directional information may therefore be accomplished in a manner substantially transparent to the operator, allowing the operator to handle and guide payload 135 in an intuitive manner and without requiring the operator to actively request assistance from controller 115.

The information collected by sensors 155 is transmitted to a controller 115. As arranged in FIG. 1, the collected information is transmitted from sensing device 155 as a signal to controller 115 using a wireless transmitter 160, which may be enabled with Bluetooth, Wi-Fi, RFID or other suitable near field communication technology for wireless transmission of the signal. Controller 115 is configured to receive a wireless signal using Bluetooth, Wi-Fi, RFID or other suitable near field communication technology compatible with the configuration of wireless transmitter 160.

FIG. 2 shows an alternate arrangement for transmission of signals from sensing device 155, where sensing device 155 is electrically connected to controller 115 by an electrical wire or cable or wire harness 180. The information collected by sensor or sensors 155 is transmitted as a signal to controller 115 through wire harness 180. Wire harness 180 may be part of tool holder 170 or may be separately routed from controller 115 to sensing device 155. Additionally, wire harness 180 may be permanently connected to sensing device 155 or may be electrically connected to sensing device 155 through one or more connectors (not shown). Not shown, but understood by those skilled in the art, sensing device 155 may be configured to be used for both wireless and wired arrangements, such that the same sensing device could be used in the arrangement shown in FIG. 1 and the arrangement shown in FIG. 2, where in FIG. 2 the wire harness 180 would be connected to handle 150 through one or more connectors.

Referring again to the systems of FIG. 1 and FIG. 2, it is also anticipated that more than one sensing device 155 may be attached to a single payload 135. Using the example where payload 135 is an automotive engine, two sensing devices 155 may be attached at either end of one side of an engine 135, such that an operator guiding the movement of a cable suspended engine 135 can grasp both handles 150 at the same time, to provide input force to move the engine with better stability and directional control. In this arrangement, the two sensing devices 155 would transmit signals to the controller 115, which would process the signals and provide input to one or more of the assist mechanisms 111, 112 and hoist 120 of trolley 110 to assist the operator's horizontal and vertical movement of the engine 135.

The method of using the cable lift system of FIG. 1 and FIG. 2 is described further herein. A payload 135 is attached to cable 125 using a payload attachment feature 130. The payload attachment feature 130 may be attached directly to payload 135 or to a cable attachment feature 140, as described previously. The payload is initially lifted or lowered vertically by cable 125 to the desired height required for horizontal movement by hoist 120 using methods understood by those skilled in the art. Trolley 110, which is configured to move in a horizontal plane, is further configured with assist mechanisms, which may include one or more motors 112 and/or one or more brakes 111. One or more of the assist mechanisms 111, 112 and the hoist 120 may be actuated by a controller 115 to provide assistance moving cable suspended payload 135 in one or both of the horizontal and vertical planes responsive to input from sensing device 155.

One or more sensing devices 155, shown configured as handles in FIG. 1 and FIG. 2, are attached to payload 135 as described previously. In the arrangement shown in FIG. 1, an additional step may be required to register or synchronize the wireless communication between the sensors 155 and transmitter 160 of each of one or more sensing devices 155 with controller 115, using methods understood by those skilled in the art. In arrangements where the signal is transmitted through a wired connection as described previously, an additional step may be required to connect wire or wire harness 180 to sensing device 155, for example, through a pluggable connector or connectors or similar interface.

The operator grasps one or more handles 150 and sensing devices 155 and exerts a force on payload 135 through handles 150 to start movement of payload 135 in a desired direction. As discussed previously, sensors 155 are located on the configured handles 150 of the sensing device such that as the operator grasps the handle or handles 150 and exerts force in the desired direction to start movement of payload 135 from an at rest or static position, the sensors of sensing devices 155 collect force and direction information and send the information as a signal to controller 115. Controller 115 receives and processes the signal and actuates one or more of the assist mechanisms of trolley 110, which may include activating a motor or motors 112, deactivating a brake or brakes 111, and activating hoist 120 to move the trolley 110 and cable suspended payload 135 in a direction consistent with the input received from the operator through sensors 155. The movement of the trolley 110 and payload 135 by one or a combination of the assist mechanisms 111, 112 and hoist 120 substantially relieves the manual effort required from the operator to overcome the resting inertia of payload 135 and to start the movement of payload 135.

After payload 135 has been started in motion, the operator may continue to grasp handle or handles 150 to push and direct payload 135 toward its destination or final position. Sensors of the sensing device or devices 155 continue to collect force and directional information and send this information as signals to controller 115. Controller 115 continues to receive and process the signal and to actuate the assist mechanisms of trolley 110 to provide assistance consistent with the input received from the operator through sensors 155, which may include continuing the movement of the payload at a relatively constant speed or accelerating the movement of the payload. In some cases, the inertia of the moving payload 135 and the configuration of the lift system 100, 165 may be such that no incremental assistance is required from the assist mechanisms when the moving payload 135 is in continuous motion. In this case, the operator may release handle or handles 150, which may result in a no signal condition to controller 115, which would then result in a no assist condition at the trolley 110.

When payload 135 is approaching its intended destination, the operator may grasp handle or handles 150 to pull on the payload 135 to slow its movement. Sensors 155 will collect the force and directional information corresponding to the operator's pulling efforts, and will send this information as signals to controller 115. Controller 115 receives and processes the signals and actuates one or more of the assist mechanisms of trolley 110, which may include activating a brake or brakes 111 and/or hoist 120, deactivating and/or reversing a motor or motors 112 to slow and position the trolley 110 and cable suspended payload 135 consistent with the input received from the operator through sensors 155. The slowing of trolley 110 and payload 135 by assist mechanisms 111, 112 substantially relieves the manual effort required from the operator to overcome the moving inertia of payload 135 to position and slow the movement of payload 135.

As the operator continues to grasp the handle or handles 150 to stop the payload 135 at its intended destination, the sensors 155 continue to collect force and directional information and send this information as signals to controller 115. Controller 115 continues to receive and process the signal and to actuate the assist mechanisms of trolley 110 to provide assistance consistent with the input received from the operator through sensors 155.

The operator may exert one of or a combination of pulling, pushing, rotating, lifting and/or lowering motions on payload 135 as payload 135 approaches its destination, to both slow and guide payload 135 into its stopped position. In this instance, the force and direction information representing the push, pull, rotate, lower and/or lift efforts of the operator will be transmitted from the sensors 155 as a signal to the controller 115, and the controller 115 may respond by actuating one of or a combination of assist mechanisms which may include actuating at least a motor 112, a brake 111 and the hoist mechanism 120 in a pattern responsive to signals corresponding to the operator's manual input.

When movement of payload 135 is complete, for example, when payload 135 is at its destination, is in its final assembled position or has been processed such that movement by the cable lift system 100, 165 is no longer required, handle or handles 150 may be detached from the payload 135. Handle 150 may also include a "return to home" input, which can be actuated to command the trolley to return, for example, to its originating location to pick up another payload or to park the trolley.

Detached handles 150 can be redeployed for attachment to a new payload. The ability to reuse sensing devices 155 and handles 150 increases the flexibility of cable lift assist systems 100, 165 and reduces the overall operating cost of the system due to the reusability of the handle sensing devices 155 and handles 150. Further, sensing devices 155 can be configured for multiple payload configurations, for example, by being fabricated with a pattern of bolt holes or slots that can be used to adjustably fasten a handle 150 to different sensor attachment features 145 on multiple payload types, for example, a variety of engine and transmission assemblies provided to a vehicle assembly plant.

Figure 3:
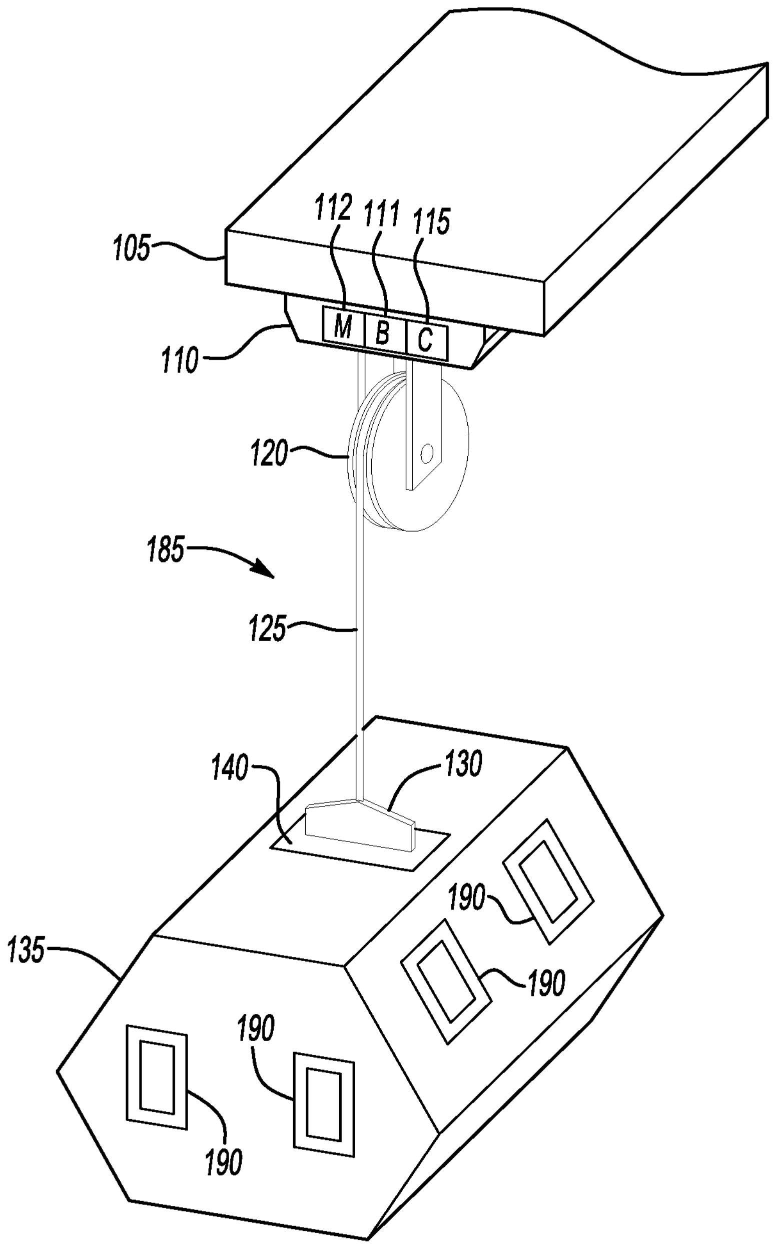
FIG. 3 is a schematic perspective view of an assisted cable lift system including wireless sensing devices configured as sensor pads.

Referring now to FIG. 3, generally indicated at 185 is a schematic perspective view of an assisted cable lift system including wireless sensing devices or sensors 155 incorporated into or configured as sensor pads 190. Each sensor pad 190 includes one or more sensors 155, where the one or more sensors 155 may be fabricated, for example, using pressure sensitive conductive materials such as force sensitive resistor tape. Each sensor pad 190 is configured to transmit a wireless signal to controller 115, where the signal is derived from force and direction information collected based on operator input into sensor pads 190. Sensor pad 190 may be attached to payload 135 by any suitable means appropriate to the payload. For example, sensor pad 190 may have an adhesive backing such that sensor pad 190 can be adhesively placed on one or more surfaces of payload 135. The adhesive may be a non-permanent adhesive; to facilitate removal of sensor pad 190 from payload. Other attachment means known to those skilled in the art may also be employed, for example, the use of hook and barb type fasteners or magnetic fastening elements, which may also allow for removal and reuse of sensor pads 190.

Sensor pads 190 are optimally placed on surface locations of payload 135 that would typically be contacted by an operator in a non-assisted lift system, so that the operator interface with payload 135 is substantially unchanged with use of an assisted lift system, and operator input can be collected in a manner which is substantially transparent to the operator, e.g., the operator's intuitive pushing, pulling, rotating, lifting and/or lowering locations and points of contact will coincide with the placement of sensor pads 190 on payload 135.

The method of using the cable lift system of FIG. 3 is similar to the method of use described for the cable lift system of FIGS. 1 and 2. After positioning one or more sensor pads 190 on payload 135, sensor pads 190 are synchronized with controller 115 by registering or synchronizing each pad 190 with controller 115 for the payload movement cycle. As described previously for FIG. 1, sensor pad or pads 190 may be attached to payload 135 as part of the process of attaching payload 135 to cable system 185, or sensor pad or pads 190 may be attached to payload 135 at an earlier time, for example, by the supplier of payload 135.

As described previously for FIGS. 1 and 2, an operator using the horizontally assisted cable lift system 185 of FIG. 3 will exert an effort against payload 135 by pressing against the one or more sensor pads 190 to start movement of payload 135 in a desired direction. As the operator presses against sensor pads 190 and exerts force in the desired direction to start movement of payload 135 from an at rest or static position, the sensor pads 190 collect force and direction information and send the information as a signal to controller 115. Controller 115 receives and processes the signal and actuates the assist mechanisms of trolley 110, which may include one of or a combination of activating a hoist 120, activating motor or motors 112, and deactivating a brake or brakes 111 to move the trolley 110 and cable suspended payload 135 in a direction consistent with the input received from the operator through sensor pads 190. The movement of the trolley 110 and payload 135 by assist mechanisms 112 substantially relieves the manual effort required from the operator to overcome the resting inertia of payload 135 and to start the movement of payload 135.

After payload 135 has been started in motion, the operator may continue to press on sensor pad or pads 190 to push and direct payload 135 toward its destination or final position. Sensor pads 190 continue to collect force and directional information and send this information as signals to controller 115. Controller 115 continues to receive and process the signals and to actuate the assist mechanisms of trolley 110 to provide assistance consistent with the input received from the operator through sensor pads 190. In some cases, the inertia of the moving payload 135 and the configuration of the lift system 185 may be such that no incremental assistance is required from the assist mechanisms when the moving payload 135 is in continuous motion. In this case, the operator may cease to press against sensor pads 190, which may result in a no signal condition to controller 115, which would then result in a no assist condition at the trolley.

When payload 135 is approaching its intended destination, the operator may push against sensor pads 190 on payload 135 to slow its movement. Sensor pads 190 will collect the force and directional information corresponding to the operator's pushing efforts, and will send this information as signals to controller 115. Controller 115 receives and processes the signals and actuates one or a combination of the assist mechanisms of trolley 110, which may include activating a hoist 120, activating a brake or brakes 111, and/or deactivating or reversing a motor or motors 112 to slow and position the trolley 110 and to affect the movement of cable suspended payload 135 consistent with the input received from the operator through sensor pads 190. The slowing and positioning of trolley 110 and payload 135 by assist mechanisms 111, 112 and hoist 120 substantially relieves the manual effort required from the operator to overcome the moving inertia of payload 135 and slow the movement of payload 135.

As the operator continues to push against sensor pads 190 to stop the payload 135 at its intended destination, the sensor pads 190 continue to collect force and directional information and send this information as signals to controller 115. Controller 115 continues to receive and process the signal and to actuate the assist mechanisms of trolley 110 to provide assistance consistent with the input received from the operator through sensors 155, which may include actuating a combination of assist mechanisms which may include activating and deactivating at least one motor 112 and one brake 111 and hoist mechanism 120 in a pattern responsive to signals received representing the operator's manual input.

When movement of payload 135 is complete, for example, when payload 135 is at its intended destination, or is in its final assembled position or has been processed such that movement by the cable lift system 185 is no longer required, sensor pads 190 may be detached from the payload 135. The sensor pad 190 may also include a "return to home" input, which can be actuated to command the trolley to return to, for example, its originating location to pick up another payload or to park the trolley.

Removable sensor pads 190 may be redeployed after removal for attachment to a new payload. The ability to reuse the sensor pads 190 increases the flexibility of the cable lift assist system 185 and may reduce the overall operating cost of the system due to the reusability of the sensor pads 190.

Further, sensing devices such as sensor pads 190 can be configured for multiple payload configurations, for example, by being fabricated in a shape that can be fastened to a variety of engine and transmission assemblies provided to a vehicle assembly plant. Alternatively, one or more of the sensor pads 190 may remain on payload 135 permanently, for example, where installation of payload 135 into an larger assembly precludes access after installation to remove sensor pad 190 or where removal and reuse of the sensor pad 190 is not economically advantageous and the presence of sensor pad 190 is non-detrimental to payload 135. In this instance, sensor pad 190 can be considered disposable. Further, use of sensor pads 190 may be advantageous with payloads and scenarios which are not compatible with a handled sensing device 155, for example, the movement and stacking of granite slabs or glass sheets, where handles 150 may interfere with or reduce the efficiency of a stacked storage arrangement.

Figure 4:
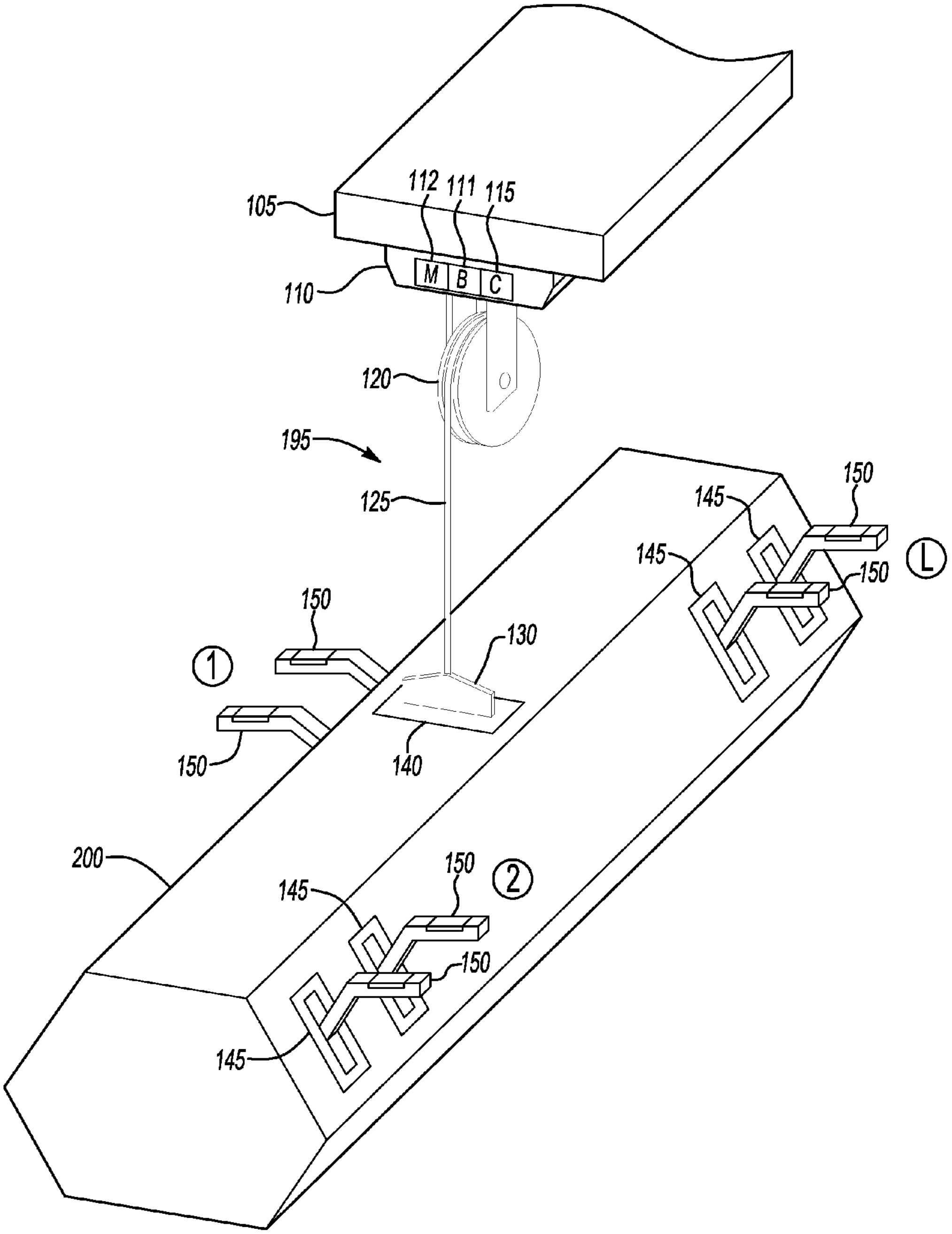
FIG. 4 is schematic perspective view of a multi-operator assisted cable lift system with detachable wireless sensing devices.

Referring now to FIG. 4, generally indicated at 195 is a schematic perspective view of a multi-operator horizontally assisted cable lift system including detachable wireless sensing devices. The payload 200 shown in FIG. 4 is of sufficient size and configuration such that when payload 200 is suspended by cable 125, it is anticipated that the movement of payload 200 will require the coordinated input of more than one operator, with the number of operators determined as appropriate to move the particular payload size and configuration. For purposes of illustration, the multi-operator cable lift system 195 will be described using an example of three operators. The wireless sensing devices 155 shown in FIG. 4 are of the previously described handle type 150, however the wireless sensing devices 155 could also be of the previously described sensor pad type 190 within the scope of the claimed invention.

As shown in FIG. 4, three pairs of sensing handles 150 have been operatively attached to payload 200 at locations identified in circles as L, 1 and 2. Locations L, 1 and 2 correspond with the location of a lead operator (L), a first operator (1) and a second operator (2), where each operator will exert force on payload 200 through one or both handles 150 at the operator's location. As described previously, handles 150 are attached to payload 200, and registered with controller 115. Controller 115 will recognize signals from handles 150 used by the lead operator (L) as the lead (L) signals; signals from handles 150 used by the first operator (1) as signals from location (1); and signals from handles used by the second operator (2) as signals from location (2).

When payload 200 is moved by the multiple operators (L), (1) and (2), controller 115 receives input from one or more sensing devices 155 incorporated into handles 150. The controller 115 processes the received signals according to a predetermined program which may be, for example, a control algorithm. Those skilled in the art would recognize the control algorithm would be developed based on the configuration of the sensing devices for a particular application and payload, the number of operators, etc., using known methods for control algorithm development. The control algorithm is designed to prioritize the input signal from the lead operator (L) handle or handles 150 and accept and process input signals from handles 150 used by operators (1) and (2) only when these input signals are not conflicting with input signals received from the lead operator (L) handles 150.

The system of FIG. 4 may be further configured to change the lead operator role from the operator (L) to either of the operators at locations (1) or (2). In this scenario, one of the operators at location (1) or (2) may request to be the new lead operator. The current lead operator (L) confirms the role change to controller 115, and controller 115 begins processing signals from the new lead operator location as the lead (L) signals. Concurrently with a change in the lead role or location, the controller 115 may place the trolley 110, assist mechanisms 111, 112 and hoist mechanism 120 in a safe state. Additionally, the cable lift system 195 may include a status light system or other indicator system to identify the operator location which is confirmed as the lead role at any point in time, especially in situations where the size or configuration of the payload 200 inhibits the visibility of one or more operators from another operator.

While the best modes for carrying out the invention have been described in detail, those familiar with the art to which this invention relates will recognize various alternative designs and embodiments for practicing the invention within the scope of the appended claims.

The invention claimed is:

1. A handling system configured to provide assistance, including horizontal assistance, to an operator manually moving a payload which is flexibly suspended, comprising:

a trolley adapted to assist manual movement of the payload by the operator in at least one of a horizontal plane and a vertical plane;

a flexible suspension device configured to operatively attach to a trolley at a first end and to the payload at the second end;

a sensing device attachable to the payload and configured to be contacted by the operator during manual movement of the payload by the operator;

wherein the sensing device is configured:

to sense a force input and directional information corresponding to the manual movement of the payload by the operator in contact with the sensing device; and to transmit a signal responsive to the force input and the direction information;

a controller configured to receive and process the signal from the sensing device and provide input to the trolley; and wherein the trolley is adapted to assist manual movement of the payload by the operator in response to the input from the controller.

2. The handling system of claim 1, wherein manual movement of the payload by the operator in at least one of a horizontal plane and a vertical plane includes at least one of a starting, accelerating, continuing, slowing, stopping, lifting, lowering, tilting, angling and rotating movement of the payload.

3. The handling system of claim 1, wherein the sensing device is further detachable and/or disposable from the payload after movement of the payload by the handling system is completed.

4. The handling system of claim 1, wherein the sensing device is further configured to remain attached to the payload after movement of the payload by the handling system is completed.

5. The handling system of claim 1, wherein the signal is configured as a wireless signal.

6. The handling system of claim 1, further comprising:

a handle;

wherein the sensing device is incorporated into the handle; and wherein the handle is operatively attachable to the payload, and is configured for operator use to guide the manual movement of the payload by the operator.

7. The handling system of claim 1, further comprising:

a sensor pad;

wherein the sensing device is incorporated into the sensing pad; and wherein the sensor pad is attachable to the payload in a configuration such that the sensor pad is contacted by the operator during manual movement of the payload by the operator.

8. The handling system of claim 1, further comprising at least one brake to assist movement.

9. The handling system of claim 1, further comprising at least one motor to assist movement.

10. The handling system of claim 1, wherein the controller is configured to provide input to move the trolley to a predetermined location.

11. The handling system of claim 1, further comprising:

a plurality of sensing devices, wherein each of the plurality of sensing devices is configured to transmit a respective signal to provide a plurality of signals;

wherein each of the respective signals is assignable to a corresponding respective one of the plurality of sensing devices by the controller; and wherein the controller is further configured to receive and process the plurality of signals and provide input to the trolley.

12. The handling system of claim 11, further comprising:

wherein the controller is further configured to process the plurality of signals from the plurality of sensing devices using an algorithm;

wherein the plurality of sensing devices includes a first sensing device configured to transmit a first signal and at least a second sensing device configured to transmit a second signal;

wherein the controller is configured to dynamically and exclusively assign one of the first and at least second signals as the lead signal;

wherein the controller is configured to dynamically and exclusively assign the other of the first and at least second signals as the lead signal; and wherein the lead signal is identifiable by the controller and prioritized by the algorithm.

* * * * *